United States Patent [19]

Maddox et al.

[11] 3,868,857

[45] Mar. 4, 1975

[54] AUDIO DOSIMETER

[75] Inventors: Edward L. Maddox, Lexington; Robert A. Pease, Wilmington, both of Mass.

[73] Assignee: Teledyne, Inc., Los Angeles, Calif.

[22] Filed: Nov. 16, 1972

[21] Appl. No.: 307,082

[52] U.S. Cl. .................... 73/558
[51] Int. Cl. .................... G01h 5/00
[58] Field of Search ....... 181/.5 NP, .5 AP; 179/1 N

[56] References Cited

UNITED STATES PATENTS

| | | | |
|---|---|---|---|
| 2,671,134 | 3/1954 | Chrystie | 181/.5 AP |
| 3,089,561 | 5/1963 | Michael | 181/.5 AP |
| 3,594,506 | 7/1971 | Bauer | 181/.5 AP |
| 3,615,162 | 10/1971 | Barker | 181/.5 AP |
| 3,696,206 | 10/1972 | Ida | 181/.5 NP |

*Primary Examiner*—Benjamin A. Borchelt
*Assistant Examiner*—J. V. Doramus

[57] ABSTRACT

An audio dosimeter for individual use determining exposure to sound energy as a function of both frequency and pressure level, with integration over the time of exposure and incorporating storage means preserving a quantitative measure of the exposure.

6 Claims, 8 Drawing Figures

AUDIO DOSIMETER

BRIEF SUMMARY OF THE INVENTION

Generally, this invention comprises an audio dosimeter for individual use comprising, in series circuit in the order recited, electronic microphonic sound sensor means, a filter-amplifier receiving the a-c voltage output of the sound sensor means, said filter-amplifier comprising an operational amplifier connected in circuit with a plurality of a-c filter networks each having individual band pass characteristics preselected to collectively interact to shape the a-c voltage output during transmission by the filter-amplifier to conform to the pattern of a preselected weighting network incorporating in the a-c voltage output the otolaryngologically (and psychologically) harmful contribution of ambient sound frequency, linear detector means rectifying the a-c voltage output from the filter-amplifier, a non-linear network shaping the d-c output current from the linear detector to the function required to produce a substantially straight line of correct slope in a plot of decibels referred to a preselected current level versus sound energy input level in decibels, and an electrochemical integrating cell receiving the output current from the non-linear network measuring sound frequency in terms of sound pressurer with weighted frequency and time of exposure conjointly.

DRAWINGS

The following drawings, detail a preferred embodiment of the invention and the physical principles of operation:

FIG. 1 is a plot of the Walsh-Healey Law permissible human exposure time in hours/day v. sound pressure level in decibels "A" weighting network (i.e., dBA), FIG. 2 is a graphic representation of "A" Weighting Attenuation in terms of decibels referred to 0 decibels at 1,000 Hz v. frequency in Hz (logarithmic scale), FIG. 3 is Output (i.e., integrating) Current response in decibels referred to 111μ ampere v. Sound Input Level in dBA (+115 dBA = 119mv A.C. RMS 1kHz.) for apparatus constructed according to this invention, FIG. 4A is a block diagram of a basic audio dosimeter according to this invention, FIG. 4B is a block diagram of a low limit detection and measurement switch-off auxiliary adapted for use with the basic apparatus of FIG. 4A, FIG. 4C is a block diagram of the basic apparatus of FIG. 4A, provided with the auxiliary of FIG. 4B and including, additionally, a latch and indicator circuit for high level detection and indication, and FIGS. 5A and 5B, as to which the latter is an extension of the former, are detailed circuit diagrams of a preferred embodiment of this invention, the circuitry of FIG. 5A and the non-linear network and electrochemical integrating cell of FIG. 5B collectively constituting the basic audio dosimeter of this invention, whereas the remainder of FIG. 5B constitutes the low limit detection and measurement switch-off auxiliary and the latch and indicator circuit auxiliary for high level detection and indication.

GENERAL

The physiologically (and psychologically) injurious effects of sound energy have been appreciated for a long time; however, it has only been since the passage of the Walsh-Healey Law that quantitative limits have been set on human exposure. The official standards prescribed are set forth in the Federal Register, Vol. 35, No. 17 — Saturday, Jan. 24, 1970. These standards have now been embodied in American National Standards Institute (ANSI) standard Sl. 4-1971 (refer particularly Table 1 and FIG. 3, page 14).

The statutory Permissible (Human) Noise Exposures settled upon are (wherein "dBA" represents "A" Weighted Sound Pressure Level):

TABLE I

| Duration Per day, hours | Sound Pressure Level, dBA slow response |
|---|---|
| 8 | 90 |
| 6 | 92 |
| 4 | 95 |
| 3 | 97 |
| 2 | 100 |
| 1½ | 102 |
| 1 | 105 |
| ½ | 110 |
| ¼ or less | 115 |

In explanation of Table I, the footnote (1) applicable thereto reads:

"When the daily noise exposure is composed of two or more periods of noise exposure at different levels, their combined effect should be considered, rather than the individual effect of each. If the sum of the following fractions: $C_1/T_1 + C_2/T_2 + \ldots . C_n/T_n$ exceeds unity, then, the mixed exposure should be considered to exceed the limit value. $C_n$ indicates the total time of exposure at a specified noise level and $T_n$ indicates the total time of exposure permitted at that level."

In addition, Section 50-204.10, "Occupational noise exposure," of the legislation requires that protection be provided to employees subjected to sound exceeding the limits of Table I, and that, in all cases where sound levels exceed the tabulated values, "a continuing effective hearing conservation program shall be administered."

The graphical relationship of permissible human exposure time in hours/day versus sound level in dBA set out in Table I is shown in FIG. 1.

From the foregoing, it is seen that individual employee monitoring analogous to that heretofore provided for workers exposed to nuclear radiation or the like is now mandatory as regards noise. This can only be provided by portable individual audio dosimeters, worn by the employee during his entire work day, not only in the work area itself but also in the cafeteria, change house, or anywhere else he may visit on either a regular or irregular basis, and also facilities for daily quantitative read-out and recording of consummated exposures to permit appropriate duty assignments in the conduct of hearing conservation programs, as well as the identification of work areas of potential auditory peril.

DETAILED DESCRIPTION

The audio dosimeter of this invention is small (typically 1⅛ inches × 2¾ inches × 4¾ inches) and compact in size, light in weight (typically less than 7 ounces), and can be carried comfortably by the employee (as by neck band, belt or pocket clip or the like) without inconvenience or hindrance to work activities. Moreover, the dosimeter is reasonable in cost and rugged in design, so that it is well-suited to service in demanding industrial environments.

Figure 4A:
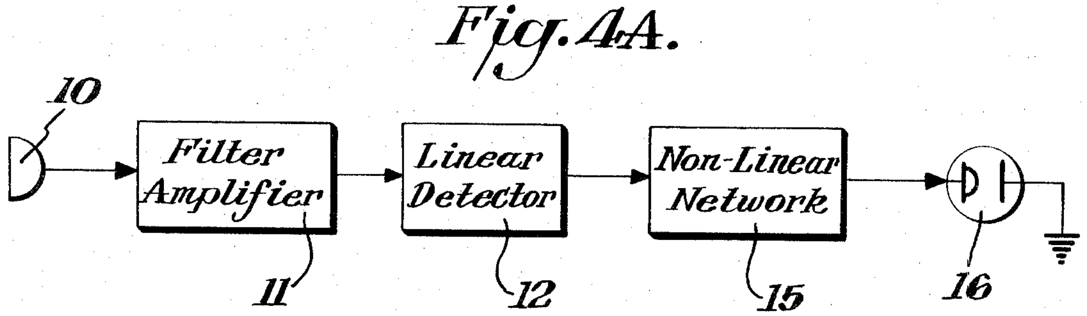
Figure 4B:
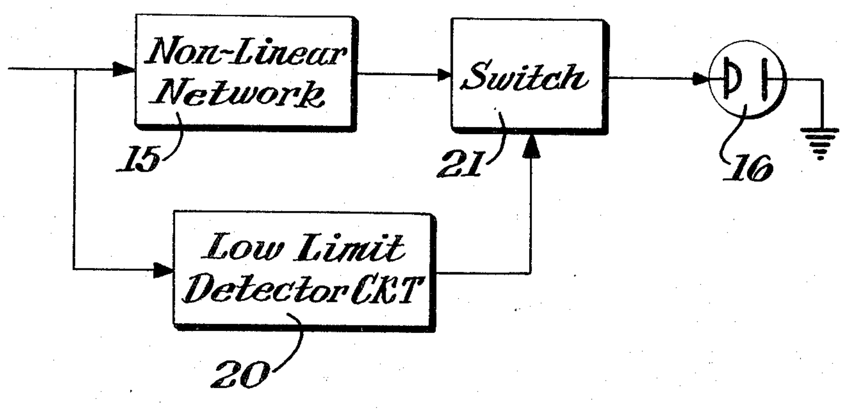
Figure 4C:
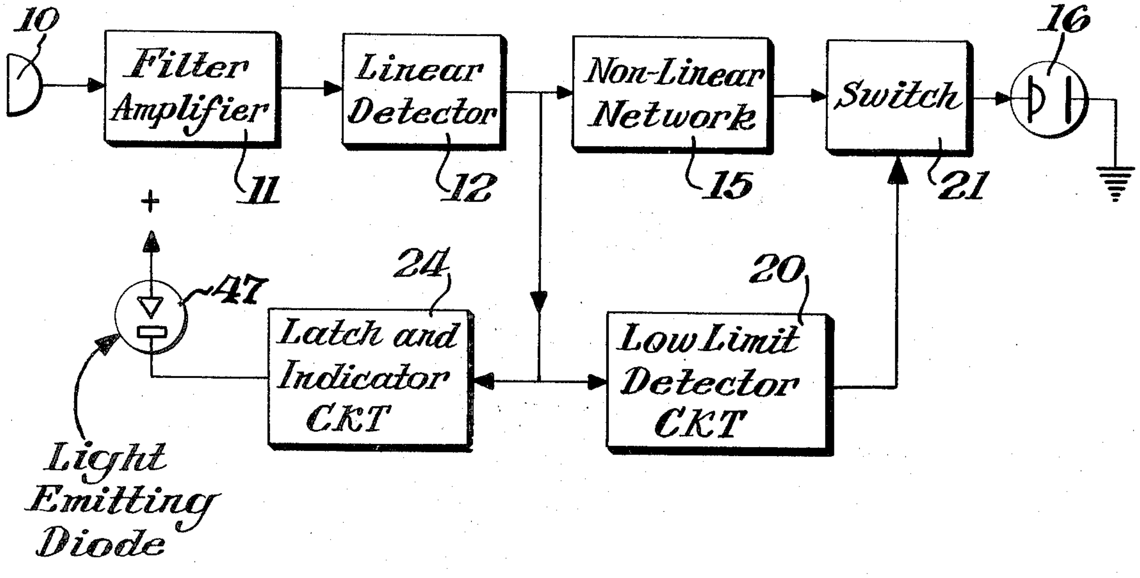

Referring to the block diagrams of FIGS. 4A–4C, inclusive, FIG. 4A shows the basic arrangement of audio dosimeter according to this invention wherein the sound signal is sensed by electronic microphone 10, typically a Shure Bros., Inc., ceramic precision microphone, Model 99A 401B having a capacitance of 460 pF. at 80° F. and a nominal level characteristic of 59.5 dB below 1 v. per microbar at 400 cps measured in a free field at a distance of 12 inches from the sound source.

The a-c voltage signal output of microphone 10 is passed to filter-amplifier 11, which, in addition to amplifying, shapes the output to conform to the preselected frequency response pattern of an "A" weighting network modeling the otolaryngologically (and psychologically) harmful contribution of ambient sound frequency.

The signal then passes to linear detector 12, which rectifies the signal and passes the resulting d-c output current to non-linear network 15. It has been found that, due to the fact that the function required to convert the voltage signal to a dB signal and the function required to convert a dB signal in turn to the requirements of the Walsh-Healey Law (which latter entails a factor of two change in signal current output for every 5 dB intensity sound signal change) are almost self-cancelling, only a small amount of shaping is necessary to make the signal conform to the requirements of the plot of FIG. 3. Non-linear network 15 does this shaping and gives an output current producing a substantially straight line of correct slope in a plot of the d-c output current received from the linear detector in terms of decibels referred to a preselected current level versus sound input level in decibels, and passes the resulting signal to an electrochemical integrating cell 16 integrating sound exposure in terms of level-weighted sound pressure and weighted frequency and time of exposure conjointly.

Since the Walsh-Healey Law Noise Criteria extends only to a low limit of 90 dBA magnitude, it is desirable to preclude the measurement of sound emanations below this level. Thus, referring to FIG. 4B, an auxiliary has been devised for this purpose, which comprises a low limit detector circuit 20 connected in parallel with respect to non-linear network 15, which operates switch 21 interposed between non-linear network 15 and electrochemical integrating cell 16 to cut out cell 16 from measurement service during any time interval in which the ambient sound energy level is below 90 dBA.

Similarly, since ambient sound energies above 115 dBA are particularly objectionable, the detection and recording of sound emanations in this excessive range is desirable. This is accomplished with yet another auxiliary comprising a latch and indicator circuit 24, operating a light-emitting diode 47, which auxiliary is shown in relationship to the basic circuit provided with a low limit detector circuit 20 and switch 21 in FIG. 4C.

Figure 5A:
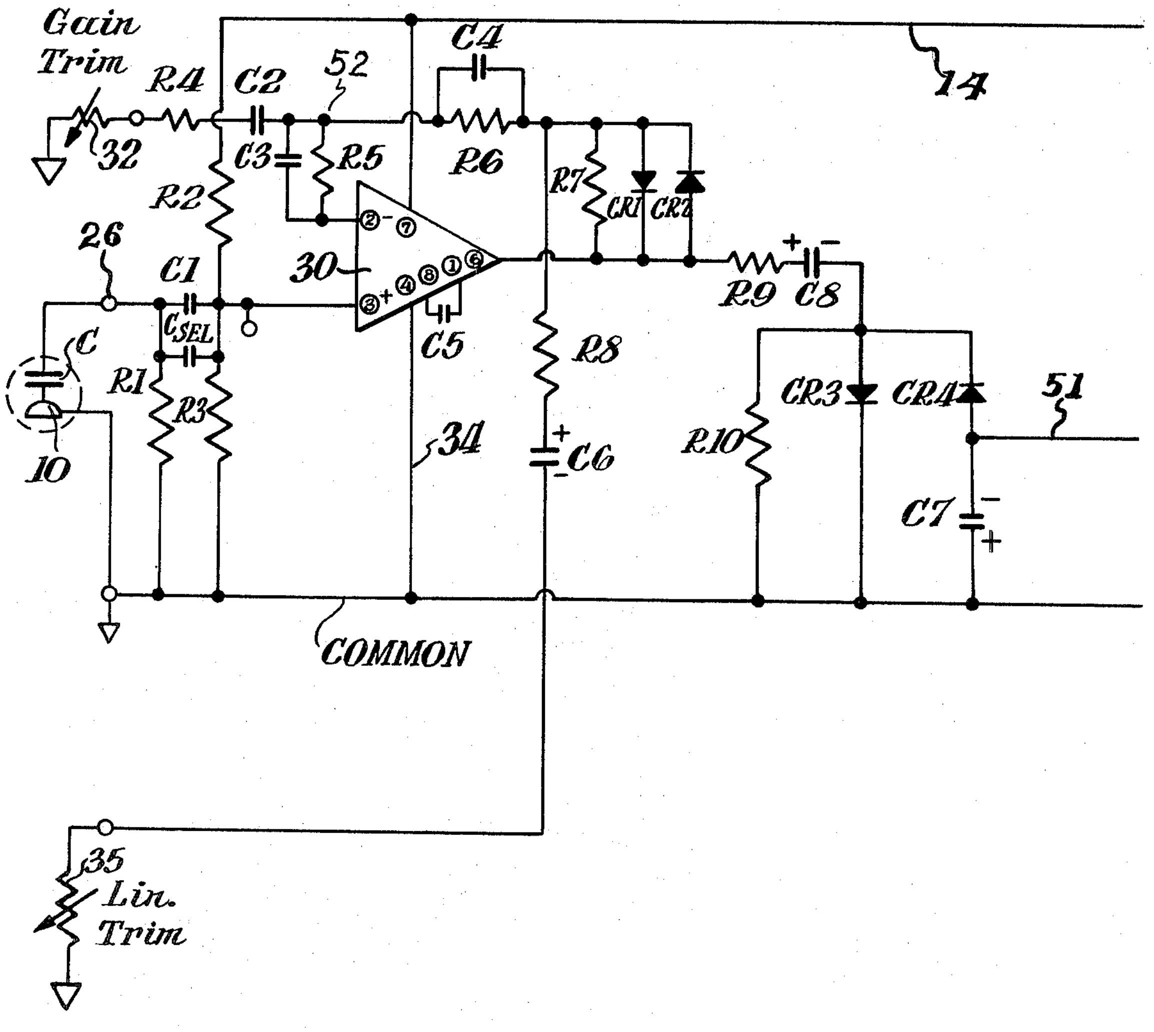
Figure 5B:
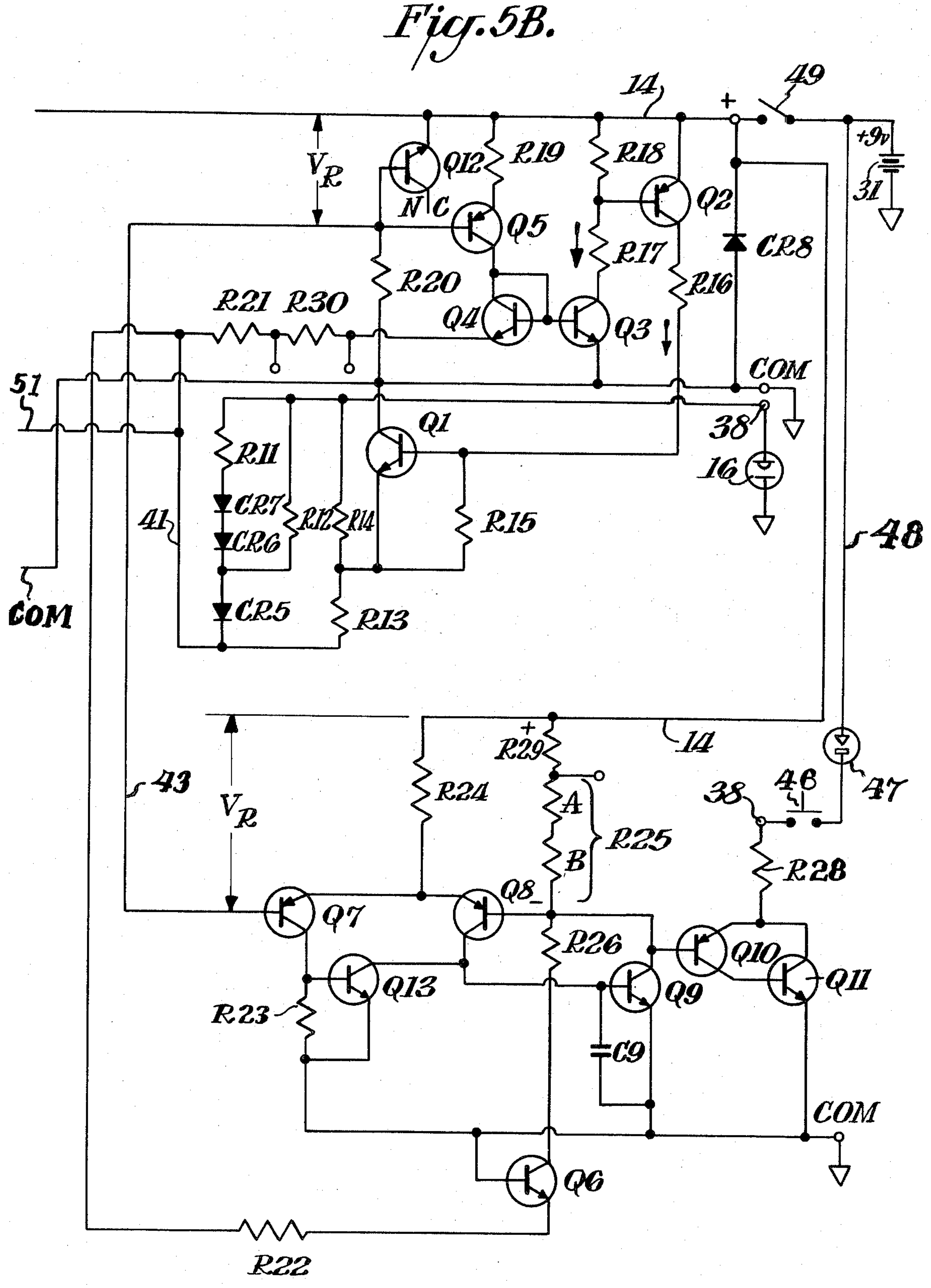

Turning now to the detailed schematic circuit of FIGS. 5A and 5B, electronic micophonic sensor 10, particularly the Model 99A 4401B hereinbefore cited as typical, includes in its internal structure a relatively large capacitance C of typically 460 pF value, which is indicated as being part of the microphone structure per se by the broken line enclosure. (If microphone 10 does not embody a capacitance of the magnitude recited, an appropriate size capacitor can be substituted in the apparatus circuit past plug-in connection 26.)

It is preferred to encapsulate as much of the circuitry as possible in conventional potting resin to give a self-contained module, and the multiple open circle plug-in connections, such as 26, drawn in FIGS. 5A and 5B denote points of electrical connection with circuitry encapsulated in modular form. This encapsulation contributes to the high inherent safety of the apparatus of this invention, particularly as regards service in atmospheres contaminated with explosive gases, which is aided by use of a low voltage source 31 possessing high internal resistance and low capacitances throughout the circuit.

The filter-amplifier of this invention comprises the operational amplifier 30 (typically an LM 301A) having feedback to the negative side only, in association with a plurality of a-c filter networks, each having individual band pass characteristics preselected to collectively interact to shape the a-c voltage output during transmission by the filter amplifier to conform to the preselected frequency response pattern of an "A" weighting network modeling the otolaryngocologically (and psychologically) harmful contribution of ambient sound frequency.

The embodiment of FIG. 5A utilizes three individual a-c filter networks, as follows:

a. The C, $R_1$ network, wherein C has a capacitance of, typically, 460 pF as hereinbefore reported, where $R_1$ is typically a 7.5 megohm resistor constituting the filter resistive portion. C, $R_1$ constitutes the first high pass filter, passing frequencies above approximately 100Hz, b. Parallel-connected $C_1$ and $C_{select)}$ in conjunction with resistor $R_2$ in parallel with resistor $R_3$ provides the second high pass filtering wherein typical values are $C_1 = 50$ pF, $C_{Sel} = 15$ pF and $R_2$ and $R_3$ each 8.2 megohms act in parallel for a-c signals, thereby passing frequencies above approximately 600 Hz. Resistors $R_2$ and $R_3$ coincidentally establish the d-c input voltage to amplifier 30 at substantially one half of the supply voltage provided by battery 31 (typically + 9v), and c. Parallel-connected capacitor $C_4$ and Resistor $R_6$, typically 82 pF and 232 Kohms, respectively, constitute a low pass filter pole producing roll off at approximately 8KHz. Capacitor $C_2$ (typically 0.1 $\mu$f) in conjunction with resistor $R_4$ (typically 8.06 Kohms) and the variable Gain-Trim resistor 32 (typically 20 Kohms) provide the high pass filter action for this third filter.

The linear detection means now to be described includes resistors $R_9$, and $R_{10}$, capacitor $C_8$, diodes $CR_3$ and $CR_4$, and capacitor $C_7$.

The a-c output signal from amplifier 30 is passed via series-connected resistor $R_9$ (typically 1 Kohm) and coupling capacitor $C_8$ (typically 10 $\mu$f) to detector diodes $CR_3$ and $CR_4$.

The function of resistor $R_9$ is to provide a quasi-peak detector circuit having characteristics responding to noise signals in approximately the same manner as to sine wave signals.

Capacitor $C_8$ couples the a-c signal to the input of the detector circuit and stores the charge on positive excursions under the action of diode $CR_3$, thereafter discharging the signal into capacitor $C_7$ by way of diode $CR_4$.

Detector diodes $CR_3$ and $CR_4$ (typically both type lN4148) are connected with $CR_4$ in series and $CR_3$ in shunt. Thus, on the positive-going excursions of the signal, diode $CR_3$ conducts current to ground, charging capacitor $C_8$, whereas, on the negative-going excursions of the signal, $CR_4$ conducts to the output and filter capacitor $C_7$ (typically 56 microfarads) which constitutes the main filter on the detector output.

Turning back to amplifier 30, the feedback is provided through diodes $CR_1$ and $CR_2$ (typically both type lN4148) connected back-to-back, which provide compensation for the forward voltage drop of detector diodes $CR_3$ and $CR_4$.

Resistor $R_7$ (typically 150 Kohms) affords an intentional leakage path around diodes $CR_1$ and $CR_2$, limiting the maximum gain of operational amplifier 30 for small signal cases. Resistor $R_6$ (typically a 232 Kohm metal film resistor) establishes the gain of the amplifier circuit in conjunction with resistor $R_4$ (typically an 8.06 Kohm metal film type) and gain-trim resistor 32.

Capacitor $C_2$, previously described, is additionally an a-c coupling for the gain path such that the a-c gain is determined by resistor $R_4$ in series with gain-trim potentiometer 32 and in ratio with resistor $R_6$. However, the d-c gain of amplifier 30, as connected, is nominally one, since there is 100 percent negative feedback at d-c.

Resistor $R_5$ (typically 3.6 megohms) is parallelconnected with capacitor $C_3$ (typically 0.01 $\mu$F) from point 52 to the negative input of amplifier 30. Resistor $R_5$ is a bias compensation resistor used to equalize the biasing at the amplifier input, the value of $R_5$ being preselected to be nominally equal to the parallel value of resistors $R_2$ and $R_3$. Capacitor $C_3$ serves as a bypass capacitor maintaining low a-c impedance across resistor $R_5$.

Capacitor $C_5$ (typically 10 pF) is a damping capacitor on amplifier 30, and conductor 34 connects the amplifier's negative supply terminal to ground. The several conductors denoted "COM" in FIGS. 5A and 5B are intended to be the "common" referred to, which can be instrument ground.

The filter-amplifier circuitry is completed by resistor $R_8$ (typically 6.8 Kohms) connected in series with capacitor $C_6$ (typically 2.2 $\mu$F) and linearity trim resistor 35. Resistor $R_8$ is a dummy load resistor, which, in conjunction with linearity trim resistor 35, imposes a loading on feedback diodes $CR_1$ and $CR_2$ which loading is adjusted for small signal level linearity trim. Capacitor $C_6$ serves as an exclusive a-c coupling for the linearity trim path inclusive of resistor $R_8$ and linearity trim resistor 35.

The detection circuit is completed by resistor $R_{10}$ (typically 1 megohm) which shunts rectifier $CR_3$ to common (or ground) thereby discharging capacitor $C_8$ when the signal level has decreased.

Figure 2:
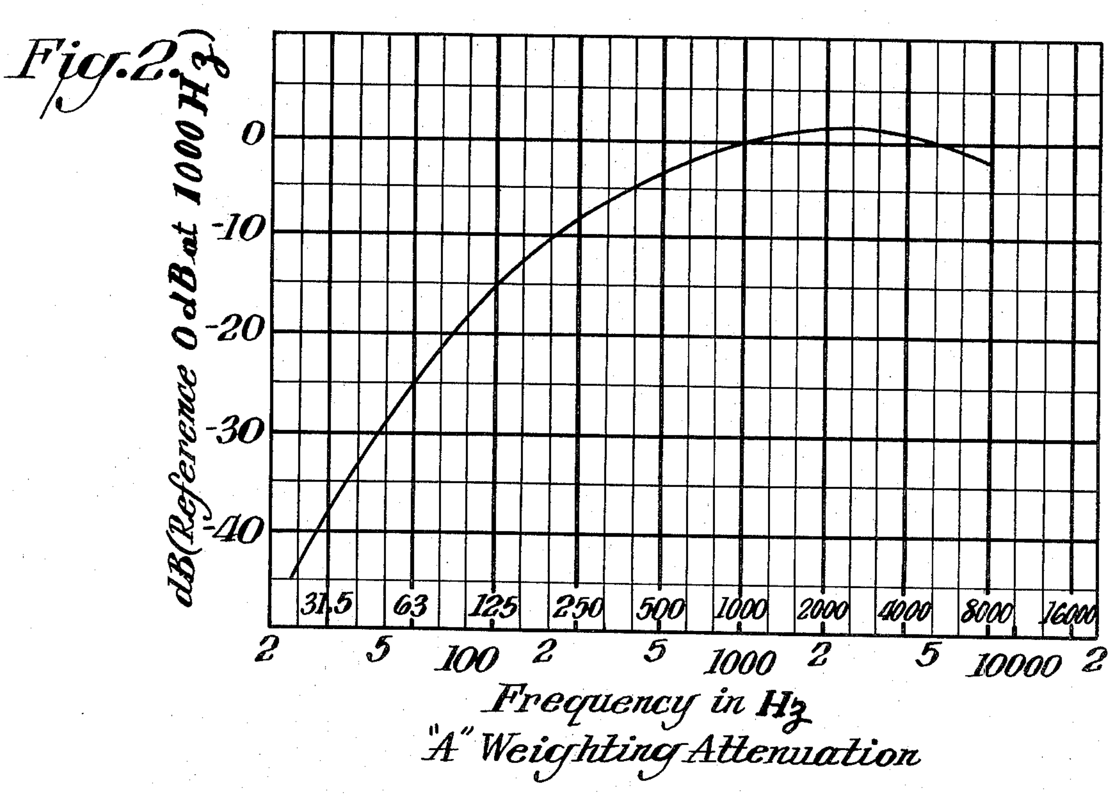
Figure 1:
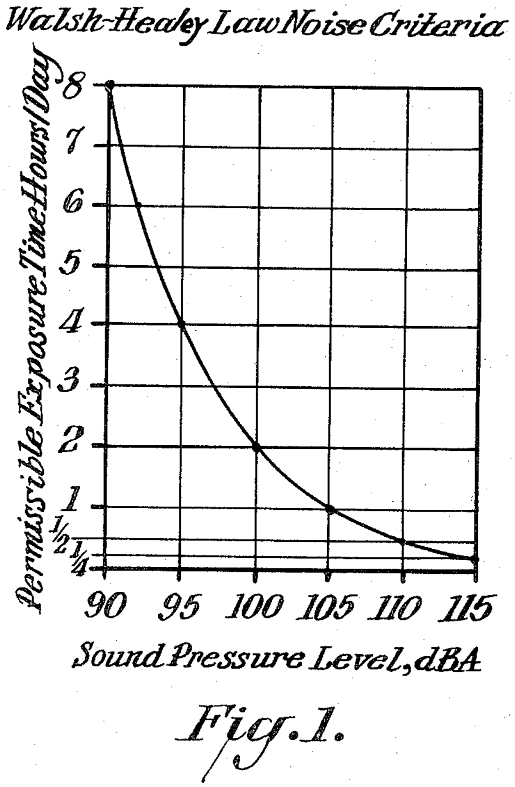
Figure 3:
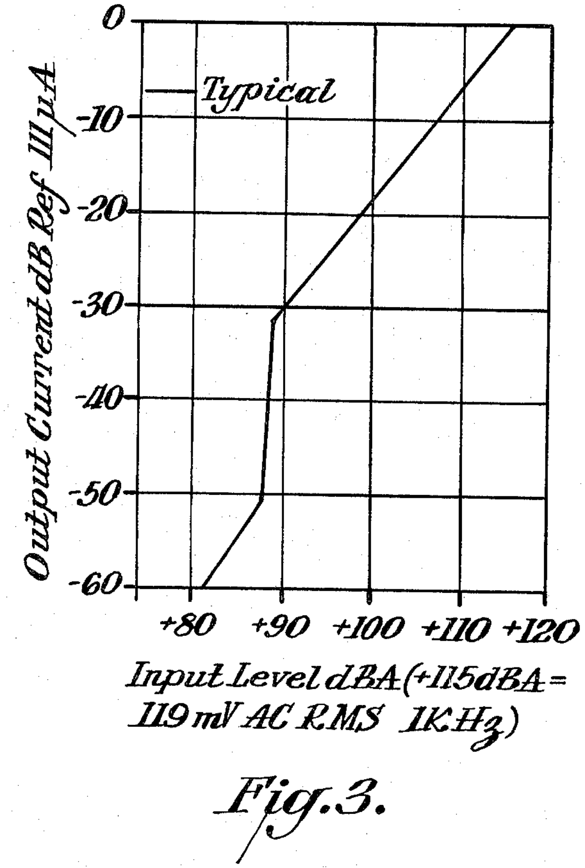

The signal is next routed, via conductor 51, to a non-linear shaping network comprising diodes $CR_5$ – $CR_7$, and resistors $R_{11}$–$R_{14}$, both inclusive. The purpose of this non-linear shaping network is to bring the signal into straight line form as regards a plot of output current in dB referred to a given current value (e.g., 111$\mu$ amp) versus sound energy input level in dBA (e.g. 115 dBA = 119mv AC RMS 1KHz) as shown in FIG. 3 for levels above +90 dBA. FIG. 3, for example, requires approximately 6 dB change in current for every 5 dB change in signal level.

The shaping effected by this non-linear network changes the response to achieve closely an approximate factor of two change in output current delivered to electrochemical integrating cell 16 for every 5 dB intensity of sound application to microphone 10, which response is plotted for typical instrument performance in FIG. 3. This represents close conformance to the Walsh-Healey Law Criteria (Some foreign countries have proposed, at least tentatively, different standards. Thus, the International Organization of Standards for certain European countries prescribes a two-fold increase in current for every 3 dB intensity of sound application to microphone 10. Obviously, a different non-linear network would be required for accommodation of these different standards. Similarly, individual countries could require a different frequency response than that specifically obtainable with the "A" weighting network, and the substitution of such different weighting networks is completely feasible in this invention by the use of filter-amplifiers 11 having different parameters).

The non-linear shaping network comprises series-connected diodes $CR_5$, $CR_6$ and $CR_7$ (all typically types lN4148) connected also in series with resistor $R_{11}$ (typically 57.6 Kohms) and thence to signal output terminal 38. By-pass resistor $R_{12}$ (typically 71.5 Kohm) is connected directly to terminal 38 from a point between diodes $CR_5$ and $CR_6$, and series-connected resistors $R_{13}$ (typically a 33.2 Kohm metal film type) and $R_{14}$ (typically a 51.1 Kohm value) are parallel-connected to outut terminal 38 with respect to diodes $CR_5$–$CR_7$ and resistor $R_{11}$ collectively.

Diodes $CR_5$, 6 and 7 apportion current through the several resistors in the following sense. When the input voltage exceeds approximately 0.5v.,$CR_5$ operates to force current through $R_{12}$ in addition to the path afforded by resistors $R_{13}$ and $R_{14}$. When the signal voltage exceeds approximately 1.5v., $CR_6$ and $CR_7$ also conduct, causing current flow through resistor $R_{11}$ in parallel with the existing paths through resistor $R_{12}$ and through series-connected $R_{13}$ and $R_{14}$.

Thus, the functions of the several resistors are as follows: $R_{11}$ in conjunction with the $R_{12}$ and the $R_{13}$, $R_{14}$ path imposes the dynamic impedance for the large signal region, $R_{12}$ in conjunction with the $R_{13}$, $R_{14}$ path imposes the dynamic impedance for the medium signal region, and $R_{13}$ and $R_{14}$ in series constitute the path from the detector to the output for the small signal levels.

The quantitative output of the basic audio dosimeter circuit hereinbefore described can be integrated by a commercially available electrochemical integrating cell 16 (typically a Bissett-Berman Model S-214 rated for about 4,000 milliampere-sseconds as full-charge integral).

Turning now to a low level signal detection and switch-off auxiliary which is an advantageous adjunct for the basic audio dosimeter, a preferred design is depicted in FIG. 5B between and above non-linear network 15 and readout cell 16.

This comprises an NPN transistor $Q_1$ (typically a type 2N3860) having its emitter connected to a point in circuit between resistors $R_{13}$ and $R_{14}$ constituting the small signal path of the non-linear shaping network hereinabove described and its collector connected to common (or ground). Transistor $Q_1$ is utilized as a shunt switch on the output current path to effectively short the output current to zero when the detected signal falls below the limit threshold (e.g., below 88 dB). Resistor $R_{15}$ (typically 1 megohm) shunts the base to the emitter of transistor $Q_1$ establishing the minimum drive current required to turn $Q_1$ on.

Transistor $Q_2$ is a PNP type transistor (typically a type 2N4249) connected through its emitter to the positive voltage supply bus 14 and through its collector and resistor $R_{16}$ (typically a 100 Kohm current limiting resistor) to the base of $Q_1$. $Q_2$ is an amplifier in the path driving $Q_1$, whereas resistor $R_{16}$ limits the maximum current supplied to $Q_1$ when it is turned on hard. $R_{18}$ (typically 1 megohm) shunts the base to emitter of transistor $Q_2$, establishing the nominal drive current required to turn $Q_2$ on at 0.5$\mu$ amp.

Transistor $Q_3$ is an NPN transistor (typically a type 2N3707) connected base-to-base with transistor $Q_4$ serving as an input amplifier in the path driving transistor $Q_1$. Resistor $R_{17}$ (typically 470 Kohms) is a current limiting resistor interposed between the base $Q_2$ and the collector of $Q_3$, which limits maximum current in case transistor $Q_3$ is turned on hard.

Resistor $R_{18}$ (typically one megohm) is connected from the transistor $Q_2$ emitter to its base, thereby establishing the current level at which transistor $Q_3$ turns transistor $Q_2$on. This current level is preselected to be nominally equal to the operating current level of the transistor $Q_5$ current source stage.

PNP transistor $Q_5$ (typically a 2N4249 type) functions as a current source producing a nominal 0.5 microamperes for the path through diode-connected transistor $Q_4$ (typically an NPN type 2N3707) and through Select resistor $R_{30}$ (typically 36 Kohms) and resistor $R_{21}$ (typically 180 Kohms) to the output of the linear detector means, via conductor 51. Select resistor $R_{30}$ permits preselection of the detector output voltage at which the voltage drop across $R_{21}$ and $R_{30}$ due to the 5$\mu$ ampere current supplied by $Q_5$ causes the emitter of $Q_4$ to be at virtual ground.

The base-collector connection of diode-connected transistor $Q_4$ is connected to the base of $Q_3$. For the detector output voltage that results in the emitter of $Q_4$ being at virtual ground, the voltage at the base of $Q_3$ is appropriate to cause $Q_3$ to produce an emitter current equal to the emitter current in $Q_4$ (0.5 microamperes). This current, most of which appears as collector current in $Q_3$, is the required amount to turn on $Q_2$ and thus $Q_1$. Thus, a specific detector output voltage level, or less, produces the condition which turns on $Q_1$, thereby shutting off the integrating currents.

The circuit hereinbefore described, due to compensation of $Q_3$'s base to emitter voltage ($V_{BE}$) by $Q_4$'s $V_{BE}$, provides for switching of $Q_1$ at a constant detector voltage for a wide range of operating temperatures.

Resistor $R_{19}$ (typically a 10 megohm resistor) is interposed in the transistor $Q_5$ emitter path and operates in conjunction with the reference voltage ($V_R$) established across the $Q_{12}$ emitter to base junction to produce a specified current level from the transistor $Q_5$ collector.

Transistor $Q_{12}$ is a NPN type (typically a 2N3563, 5.4v. V Base-Emitter Reverse Breakdown type), connected from bus 14 to the base $Q_5$, establishing reference voltage $V_R$. $Q_{12}$ functions similarly to a Zener diode and this is why the collector is not connected (abbreviated N.C.). Resistor $R_{20}$ (typically 100 Kohm) connected in circuit with the base of transistor $Q_{12}$ provides operating current for the latter.

From the foregoing, it will be understood that, with $Q_3$ connected in base-to-base coupling with $Q_4$, the detector means voltage output is applied via resistors $R_{21}$ and $R_{30}$ to the emitter of transistor $Q_4$, which is a compensating transistor whose voltage drop, emitter-to-base, compensates for the transistor $Q_3$ emitter-to-base voltage drop.

Transistor $Q_4$ is supplied with current from transistor $Q_5$, which current is set by voltage reference $V_R$. The current of transistor $Q_5$ passes, via $Q_4$, through resistors $R_{30}$ and $R_{21}$, which sets the detector output voltage for the cutoff point. Transistors $Q_3$ and $Q_4$ are at the same current at the threshold signal level.

When the negative polarity detector signal level decreases, the potential applied to resistors $R_{21}$ and $R_{30}$ is in the positive-going, or ground, direction, which turns on transistor $Q_3$, which latter turns on transistor $Q_2$. The collector of transistor $Q_2$ thereupon pulls in the positive direction, turning on transistor $Q_1$, which is the low sound signal level shunt switch precluding recording of low level sound by cell 16. The circuit described provides switching of transistor $Q_1$ with a relatively small change in the detected sound signal.

Diode $CR_8$ (typically a type 1N457) is connected in reverse across supply bus 14 and common, thereby protecting the circuitry in the event of accidental reverse battery connection. Diode $CR_8$ can withstand the maximum current produced in this event due to the high internal resistance of the particular 9v. battery type 31 used.

Referring to FIG. 5B, there is shown schematically a preferred design of latch and indicator circuit auxiliary adapted to furnish high level detection and retention of particularly harmful sound signal intensities, e.g., those exceeding the 115 dB level.

The detector output is introduced via conductor 41 in series circuit with resistor $R_{22}$ (typically a metal film 200 Kohm type) connected to the emitter of transistor $Q_6$ (typically an NPN 2N3707 type), thereby establishing the current related to the detector output voltage which is employed to drive the latch circuit. Transistor $Q_6$ operates as a common base connected stage, the emitter of which is driven by the detector voltage through resistor $R_{22}$, producing an emitter current which is transferred as collector current through resistor $R_{26}$ (typically 100 Kohms) to the base of transistor $Q_8$ (typically a PNP 2N4249 type). This current develops a potential across series-connected resistors $R_{25}$ and $R_{29}$.

Resistor $R_{25}$ conveniently consists of two series-connected separate metal film resistors A (typically 215 Kohns) and B (typically 215 Kohms), whereas resistor $R_{29}$ is a "select" resistor (typically 56 Kohms). Resistor $R_{29}$ is chosen to establish the current required through the resistor $R_{22}$, transistor $Q_6$, resistor $R_{26}$ path such that there is generated a voltage drop across the resistor $R_{25}$, $R_{29}$ combination which, at latch threshold level, will equal the reference voltage $V_R$ level applied to the base of transistor $Q_7$ via conductor 43.

Common emitter-connected PNP transistors $Q_7$ and $Q_8$ (both typically type 2N4249) form a pair sharing the current supplied through resistor $R_{24}$ (typically a 470 Kohm resistor) connected to bus 14. When the detector signal level is lower than the upper threshold level, transistor $Q_7$ conducts essentially all of the current from resistor $R_{24}$, and transistor $Q_8$ is then cut off. However, when the signal level exceeds the upper threshold, transistor $Q_8$ is turned on and then takes essentially all of the current from resistor $R_{24}$. The collector current of $Q_7$ is utilized to drive the base of NPN transistor $Q_{13}$ (typically a 2N3707 type) so that the $Q_7$ collector current produces sufficient voltage across resistor $R_{23}$ (typically 220 Kohm) to turn on transistor $Q_{13}$, which acts as a shunt switch discharging capacitor $C_9$ (typically 6.8 microfarad) and grounding the collector of transistor $Q_8$. Transistor $Q_8$'s collector current is utilized so that, when $Q_8$ is turned on and $Q_7$ is turned off, which latter itself turns off $Q_{13}$, the $Q_8$ collector current is directed to charge capacitor $C_9$. Capacitor $C_9$ serves as a time delay capacitor in the latch circuit and is charged during the time the signal voltage exceeds latch threshold level, and is discharged, when the signal voltage falls below the latch threshold level, by the shunt switch $Q_{13}$. When capacitor $C_9$ is charged to approximately 0.5 volt, transistor $Q_9$ is turned on by $Q_8$'s collector current.

Transistor $Q_9$ is an NPN type (typically a 2N3707) having its base-emitter junction connected across capacitor $C_9$ and, when $C_9$'s potential is large enough (approximately 0.5v) to permit $Q_9$ turn on, transistor $Q_9$'s collector current supplants the signal current fed to the base of transistor $Q_8$ through resistor $R_{26}$. When the collector current of $Q_9$ is sufficient to hold $Q_8$'s base potential below the reference level at $Q_7$'s base, the signal current supplied by way of the $R_{22}$, $Q_6$, $R_{26}$ path is no longer needed and the circuit is latched.

The potential appearing at $Q_9$'s collector is also applied to the base of PNP transistor $Q_{10}$ (typically a type 2N4249) whose emitter is utilized to drive resistor $R_{28}$ (typically 1 Kohm) connected with indicator output pin 38, to drive, via normally open push button switch 46, light emitting diode 47. The power supply circuit for light emitting diode 47 is completed to the supply voltage source 31 via conductor 48.

NPN transistor $Q_{11}$ (typically a 2N3707 type) is connected at its base to the collector of transistor $Q_{10}$ and at its emitter to common. Transistor $Q_{11}$ augments $Q_{10}$'s emitter current as $Q_{10}$'s collector current drives the base of $Q_{11}$. Thus, transistor $Q_{11}$ amplifies the current, delivering it as collector current back to the emitter of $Q_{10}$ and the output resistor $R_{28}$. Transistor $Q_{11}$, in fact, delivers the major portion of the output current, $Q_{10}$ being required to deliver only sufficient emitter current so as to produce a collector current sufficient to supply the base requirement of transistor $Q_{11}$.

It will be understood that the latch circuit hereinabove described detects the receipt by electronic microphonic sound sensor means 10 of sound energy in excess of a preselected high energy level, in the described instance 115 dB, preserving an indication and record of the fact by the latched condition of $Q_8$ and $Q_9$, which causes $Q_{10}$ and $Q_{11}$ to turn on the light emitting diode 47 when the push button switch 46 is closed manually.

At the end of the regular audio dosimeter service period, for example after a given 8-hour work shift the latch circuit is cleared of the illumination record by momentarily opening the power switch 49, which removes power and restores the latch circuit to condition for reuse as desired.

In service, it is practicable to maintain an audio dosimeter bank from which each employee draws his own unit at the beginning of his work shift. At the completion of the work tour, the employee returns his audio dosimeter to the bank, where the integrating cell 16 is connected across the terminals of a commercial readout device (e.g., a Bissett-Berman Model 300 EDR) and the stored exposure in electrochemical integrating cell 16 read out and recorded as the sound exposure dosage to which the employee was subjected on the data involved. The duration of readout is timed so as to preserve the time correlation which is inherent in the employee's total hour shift exposure. Typically, a 10 ma deplating current applied for 10 seconds duration represents 100 percent exposure under the Walsh-Healey Law. At the same time, exposure to excessive sound levels, as indicated by the latch and indicator circuit auxiliary, can be noted and preserved.

It may be preferred to monitor only one employee of a given group and allocate identical sound exposure to all other persons in the same environment. Or, if desired, individual dosimeters can be mounted statically in specific work areas and the sound exposure profiles obtained for each area, independent of employee travel. Individual employee exposures can then be approximated on the basis of their residence times in the areas.

The practicability of encapsulating essentially the entire electronic circuitry into a compact module form is particularly advantageous from the standpoint of long service life under demanding environmental conditions, reliability in monitoring and consistent readings obtained with relatively large number of audio dosimeters.

What is claimed is:

1. An audio dosimeter for individual use comprising, in series circuit in the order recited, electronic microphonic sound sensor means, a filter-amplifier provided with a feedback circuit receiving the a-c voltage output of said sound sensor means, said filter-amplifier comprising an operational amplifier connected in circuit with a plurality of a-c filter networks each having individual band pass characteristics preselected to collectively interact to shape said a-c voltage output during transmission by said filter-amplifier to conform to the pattern of a preselected weighting network incorporating in said a-c voltage output the otolaryngologically (and psychologically) harmful contribution of ambient sound frequency, linear detector means rectifying said a-c voltage output from said filter-amplifier, said linear detector means incorporating a pair of oppositely connected diodes as rectifying elements, and said filter amplifier feedback circuit incorporating a pair of oppositely connected diodes preselected to compensate the forward voltage drops of said pair of diodes in said linear detector means and an impedance preselected to provide the desired linearity of rectification for small signals connected between signal ground and the junction of said compensating diodes on the feedback delivery side of said compensating diodes, a non-linear network shaping the d-c output current from said linear detector to the function required to produce a substantially straight line of correct slope in a plot of decibels referred to a preselected current level versus sound energy input level in decibels, and an electrochemical integrating cell receiving the output current from said non-linear network measuring sound exposure in terms of sound pressure with weighted freqency and time of exposure conjointly.

2. An audio dosimeter for individual use according to claim 1 wherein said preselected weighting network is an "A" weighting network.

3. An audio dosimeter for individual use according to claim 1 provided with a latching circuit detecting the receipt by said electronic microphonic sound sensor means of sound energy in excess of a preselected high energy level and retaining a record of said receipt.

4. An audio dosimeter for individual use according to claim 1 provided with a latching circuit detecting the receipt by said electronic microphonic sound sensor means of sound energy in excess of a preselected high energy level provided with a light-emitting diode as indication means for readout of said record of said receipt.

5. An audio dosimeter for individual use according to claim 1 provided with low level detection means sensing the receipt by said electronic microphonic sound sensor means of sound energy below a preselected low energy level and means responsive to said low level detection means switching said electrochemical integrating cell out of measurement service during the receipt of said sound energy below said preselected low energy level.

6. An audio dosimeter for individual use according to claim 1 wherein said non-linear network shaping the d-c output current from said linear detector to the function required to produce a substantially straight line of correct slope in a plot of decibels referred to a preselected current level versus sound energy input level in decibels comprises a multiplicity of parallel-connected resistor paths automatically switched in at progressively higher signal voltage levels to provide preselected dynamic impedances collectively sufficient to obtain signal current doubling for preselected sound energy input levels in decibels conforming to a given permissible time exposure-sound pressure level pattern as standard.

* * * * *

PO-1050
(5/69)

UNITED STATES PATENT OFFICE
CERTIFICATE OF CORRECTION

Patent No. 3,868,857 Dated March 4, 1975

Inventor(s) EDWARD L. MADDOX and ROBERT A. PEASE

It is certified that error appears in the above-identified patent and that said Letters Patent are hereby corrected as shown below:

Col. 3, line 62 - "micophonic" should be --microphonic--.
Col. 3, line 63 - "4401" should be --401--.
Col. 4, line 35 - "select)" should be --sel(ect)--.
Col. 5, line 28 - "parallelcon-" should be -- parallel-con- --.
Col. 6, line 54 - "sseconds" should be --seconds--.
Col. 8, line 54 - "Kohns" should be --Kohms--.
Col. 10, line 9 - "data" should be --date--.

Signed and sealed this 29th day of April 1975.

(SEAL)
Attest:

RUTH C. MASON
Attesting Officer

C. MARSHALL DANN
Commissioner of Patents
and Trademarks